(12) United States Patent
Sharon et al.

(10) Patent No.: US 11,667,500 B2
(45) Date of Patent: Jun. 6, 2023

(54) FLUID MONITORING SYSTEM AND SUPPORT ARRANGEMENT THEREOF

(71) Applicant: KANDO ENVIRONMENTAL SERVICES LTD, Tsur Yigal (IL)

(72) Inventors: Gadi Sharon, Herzliya (IL); Eitan Meirom, Kibbutz Sde Yoav (IL); Ricardo Gilead Baibich, Menashe (IL)

(73) Assignee: KANDO ENVIRONMENTAL SERVICES LTD, Tsur Yigal (IL)

( * ) Notice: Subject to any disclaimer, the term of this patent is extended or adjusted under 35 U.S.C. 154(b) by 174 days.

(21) Appl. No.: 17/309,934

(22) PCT Filed: Jan. 2, 2020

(86) PCT No.: PCT/IL2020/050005
§ 371 (c)(1),
(2) Date: Jul. 1, 2021

(87) PCT Pub. No.: WO2020/141529
PCT Pub. Date: Jul. 9, 2020

(65) Prior Publication Data
US 2022/0073324 A1 Mar. 10, 2022

Related U.S. Application Data

(63) Continuation-in-part of application No. PCT/IL2019/051395, filed on Dec. 22, 2019.
(Continued)

(51) Int. Cl.
*G01D 11/30* (2006.01)
*B66D 3/26* (2006.01)
(Continued)

(52) U.S. Cl.
CPC ............... *B66D 3/26* (2013.01); *E03F 5/02* (2013.01); *G01D 11/30* (2013.01); *G01N 1/12* (2013.01)

(58) Field of Classification Search
CPC .. G01D 11/30; G01N 1/12; E03F 5/02; B66D 3/26
See application file for complete search history.

(56) References Cited

U.S. PATENT DOCUMENTS 3,713,224 A 1/1973 Bengoa
4,022,059 A 5/1977 Schontzler et al.
(Continued)

FOREIGN PATENT DOCUMENTS

CN 101077739 A * 11/2007
CN 108120814 A 6/2018
(Continued)

*Primary Examiner* — Jamel E Williams
(74) *Attorney, Agent, or Firm* — Vorys, Sater, Seymour and Pease LLP; Anthony P. Venturino; Maryellen Feehery Hank (57) ABSTRACT

A support arrangement for a fluid monitoring system is provided, configured for being secured within a vertical shaft and for facilitating positioning of a fluid monitor suspended therefrom. The support arrangement includes an attachment arrangement to be secured to a vertical access shaft of an open channel fluid transport system, a cross rail assembly including a cross rail and being configured to be mounted to the attachment arrangement for being supported thereby, and a lifting assembly mounted on the cross rail and configured for suspension therefrom of the fluid monitor along a vertically-extending suspension axis. The cross rail is configured to be rotatable about a vertical axis when at least partially received within the attachment arrangement. The lifting assembly is configured to be selectively secured to one of a plurality of lateral positions along the length of the cross rail.

20 Claims, 8 Drawing Sheets

Related U.S. Application Data

(60) Provisional application No. 62/787,476, filed on Jan. 2, 2019.

(51) Int. Cl.
  *E03F 5/02* (2006.01)
  *G01N 1/12* (2006.01)

(56) References Cited

U.S. PATENT DOCUMENTS

| | | |
|---|---|---|
| 4,157,657 A | 6/1979 | Hinchman |
| 5,091,863 A | 2/1992 | Hungerford et al. |
| 2003/0037602 A1 | 2/2003 | Glasgow, Jr. et al. |
| 2009/0105969 A1 | 4/2009 | Saylor |

FOREIGN PATENT DOCUMENTS

| | | |
|---|---|---|
| CN | 108387399 A | 8/2018 |
| DE | 40 06 689 A1 | 8/1991 |
| DE | 101 30 221 C1 | 1/2003 |
| KR | 10-1222811 B1 | 1/2013 |

\* cited by examiner

FLUID MONITORING SYSTEM AND SUPPORT ARRANGEMENT THEREOF

TECHNOLOGICAL FIELD

The presently disclosed subject matter relates to system for monitoring fluids such as sewage/wastewater in open channel vessels, an in particular to support arrangements thereof.

BACKGROUND

Figure 1:
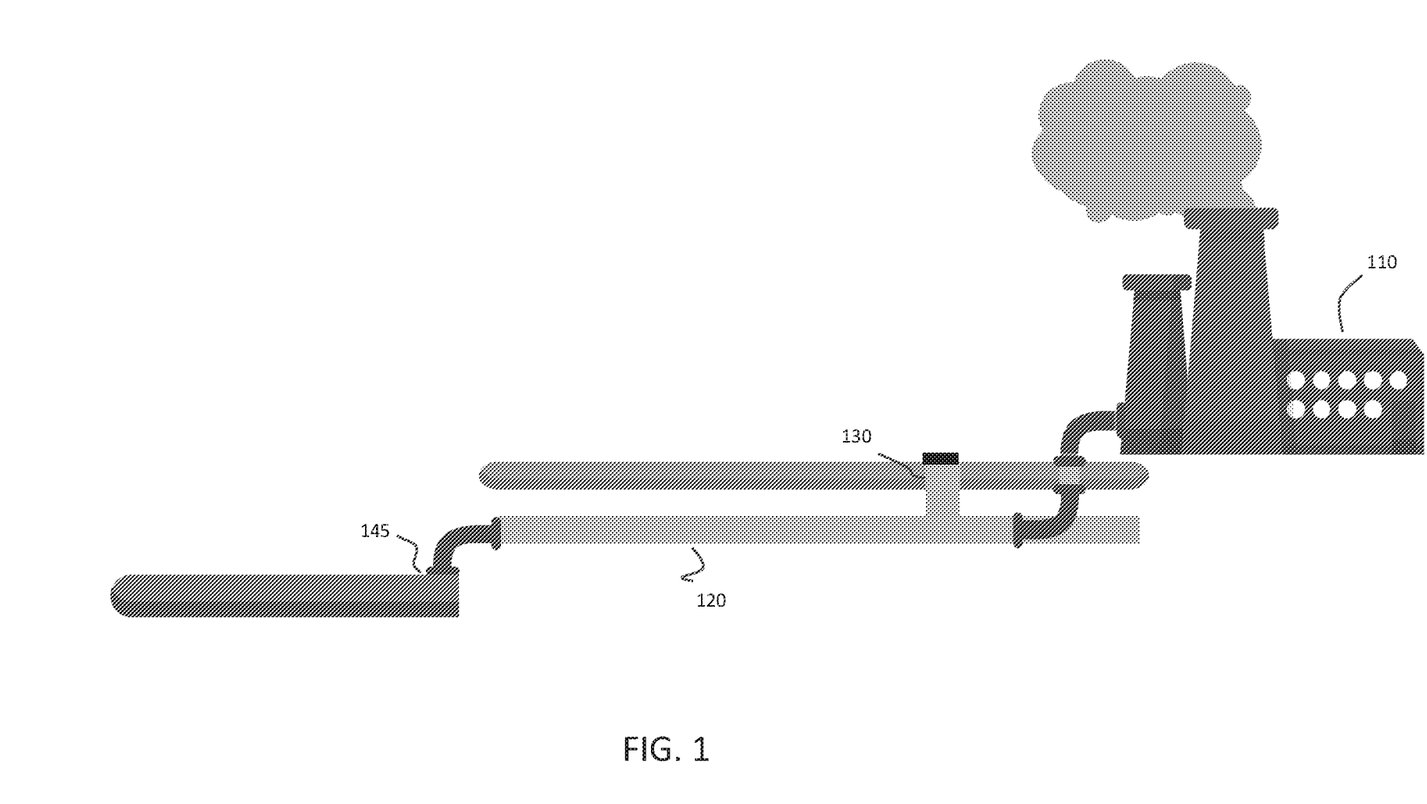
FIG. 1 is a schematic illustration of a sewer system.

As illustrated in FIG. 1, an industrial facility 110 may output a fluid which requires monitoring, such as wastewater, to an open channel vessel, such as an underground sewer duct 120 or an accumulation point 145 of a sewer system. One or more vertical access shafts 130, e.g., manholes, spanning between an accessible area such as a street, sidewalk, etc., are typically disposed at various locations above the open channel vessel, thereby enabling a technician to access it, for example in order to perform monitoring and/or maintenance.

Automated monitoring systems are typically deployed, for example in vertical access shafts, to monitor conditions of the fluid within the open channel vessels at different points within the sewer system. Such monitoring systems comprise fluid monitors, which are often subject to fouling and corrosion. Accordingly, they must be regularly maintained and/or replaced. and in some cases must be frequently replaced. The fluid monitors may be contact-based, i.e., immersed in the fluid during use, or contactless monitors, for example utilizing ultrasound, spectrography, laser, LIDAR, etc.

SUMMARY

According to an aspect of the presently disclosed subject matter, there is provided a support arrangement configured for being secured within a vertical shaft and for facilitating positioning of a fluid monitor suspended therefrom, the support arrangement comprising:
  an attachment arrangement configured to he secured to a vertical access shaft of an open channel fluid transport system;
  a crossrail assembly comprising a cross rail and being configured to be mounted to the attachment arrangement for being supported thereby; and
  a lifting assembly mounted on the crossrail and configured for suspension therefrom of the fluid monitor along a vertically-extending suspension axis;
  wherein the crossrail is configured to be rotatable about a vertical axis when at least partially received within the attachment arrangement; and
  wherein the lifting assembly is configured to be selectively secured to one of a plurality of lateral positions along the length of the crossrail.

The crossrail assembly may further comprises an arcuate mounting component configured to engage with the attachment arrangement for securing thereby and the rotation about the vertical axis.

The mounting component may comprise a lip configured to lie on the attachment arrangement.

The lip and attachment arrangement may be configured to resist rotation of the crossrail assembly when it is supported by the attachment arrangement.

The crossrail may be rigidly connected to the mounting component.

The lifting assembly and crossrail may be configured to facilitate slidable mounting of the lifting assembly to the crossrail.

The support arrangement may further comprise an arresting mechanism configured to secure the lifting assembly at one of the lateral positions.

The arresting mechanism may comprise a set screw configured to mate with one of the lifting mechanism or the crossrail, and to be tightened to bear against the other of the lifting mechanism or the crossrail.

The arresting mechanism may comprise a snug fit between the lifting assembly and the crossrail.

The arresting mechanism may comprise a plurality of apertures formed along the length of the crossrail and each corresponding to one of the lateral positions, and further comprise a pin configured to mate with one of the apertures and to arrest movement of the lifting assembly.

The crossrail may intersect e vertical axis. The crossrail may be offset from the vertical axis.

The lifting assembly and crossrail are may be configured such that, in at least one of the plurality of positions, the suspension axis is coincident with the vertical axis.

The attachment arrangement may comprise a plurality of attachment elements. Each of the attachment elements may comprise one or more mounting apertures for receipt therethrough of a connection element. Each of the attachment elements may comprise an elongate member with a mounting plate pivotally articulated to an upper end thereof, the mounting apertures being formed in the mounting plate.

The attachment arrangement may comprise three of the attachment elements.

The attachment arrangement may comprise an arcuate carrying member configured to hear the crossrail assembly.

The carrying member may be formed as a circle and define a central aperture configured for receipt therethrough of the crossrail assembly.

The carrying member may be thrilled with an upper surface comprising at least an inwardly disposed circular margin which is unobstructed by any other element of the attachment arrangement.

The support arrangement may further comprise one or more auxiliary elements carried by the crossrail assembly. At least some of the auxiliary elements may be configured for operating with the support arrangement and/or with the fluid monitor.

The one or more auxiliary elements may comprise at least one selected from the list including a power supply, a controller, a transceiver, a display unit, an input port, and an output port.

The crossrail assembly may further comprise a basket carrying the auxiliary elements.

The crossrail may define a vertical plane passing therethrough, wherein all of the auxiliary elements are disposed on a first side of the plane, the suspension axis lying on a second side of the plane.

The support arrangement may be configured to dispose the fluid monitor to a predetermined vertical position therebelow.

The lifting assembly may comprise a motor-driven pulley assembly configured to selectively raise and lower the fluid monitor.

The pulley assembly may comprise a cable, a first end of the cable carrying the fluid monitor, and a second end of the cable comprising a counterweight.

The support arrangement may be configured to allow positioning the suspension axis at any position intersecting a circle defined by extreme lateral positions of the lifting assembly on the crossrail.

The attachment arrangement may he configured to be secured to a sidewall of the vertical access shaft.

The attachment arrangement ay he configured to be secured to a cover of the vertical access shaft.

According to another aspect of the presently disclosed subject matter, there is provided a fluid monitoring system comprising a fluid monitor and the support arrangement as described above.

BRIEF DESCRIPTION OF THE DRAWINGS

In order to better understand the subject matter that is disclosed herein and to exemplify how it may be carried out in practice, embodiments will now be described, by way of non-limiting example only, with reference to the accompanying drawings, in which.

DETAILED DESCRIPTION

In the following detailed description, numerous specific details are set forth in order to provide a thorough understanding of the invention. However, it will be understood by those skilled in the art that the presently disclosed subject matter may be practiced without these specific details. In other instances, well-known methods, procedures, components and circuits have not been described in detail so as not to obscure the presently disclosed subject matter.

Unless specifically stated otherwise, as apparent from the following discussions, it is appreciated that throughout the specification discussions utilizing terms such as "processing," "computing," "representing," "comparing," "generating," "assessing," "matching," "updating," "determining," "calculating," or the like, refer to the action(s) and/or processes) of a computer that manipulate and/or transform data into other data, said data represented as physical, such as electronic, quantities and/or said data representing the physical objects. The term "computer" should be expansively construed to cover any kind of hardware-based electronic device with data processing capabilities including, by way of non-limiting example, processing and memory circuitry therein disclosed in the present application.

The terms "non-transitory memory" and "non-transitory storage medium" used herein should be expansively construed to cover any volatile or non-volatile computer memory suitable to the presently disclosed subject matter.

The operations in accordance with the teachings herein may be performed by a computer specially constructed for the desired purposes or by a general-purpose computer specially configured for the desired purpose by a computer program stored in a non-transitory computer-readable storage medium.

Embodiments of the presently disclosed subject matter are not described with reference to any particular programming language. it will be appreciated that a variety of programming languages may he used to implement the teachings of the presently disclosed subject matter as described herein.

Figure 2:
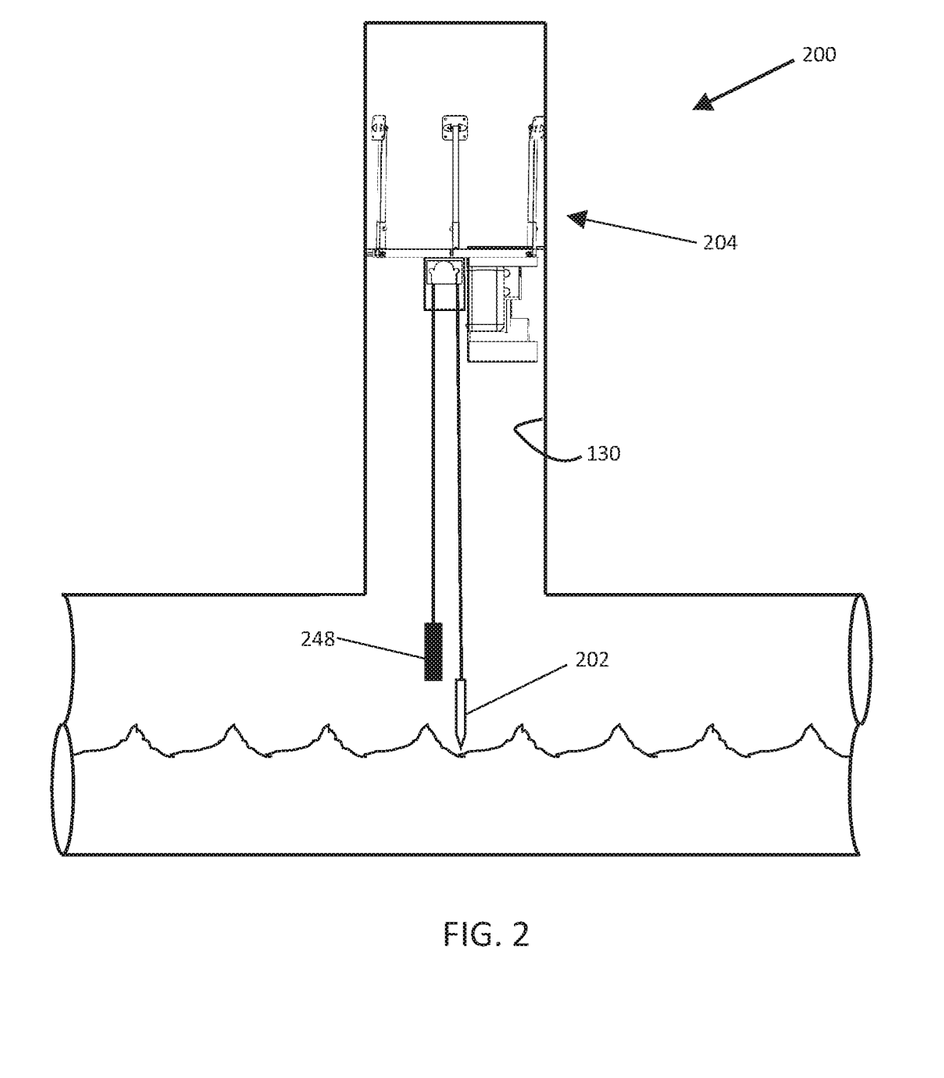
FIG. 2 is a schematic illustration a fluid monitoring system according to the presently disclosed subject matter, deployed in the sewer system illustrated in FIG. 1.

As illustrated in FIG. 2, a fluid monitoring system, which is generally indicated at 200, may be provided, for example in a vertical access shaft 130 provided above an open channel vessel, in which wastewater or another fluid to be monitored flows. The fluid monitoring system 200 may comprise a fluid monitor 202, suspended from a support arrangement 204 configured to facilitate positioning thereof, for example in the wastewater within the open channel vessel.

It will be appreciated that herein the disclosure and claims, terms relating to direction, such as "upper," "lower," "above," "below," etc., and similar/related terms are used with reference to the orientation in the accompanying drawings based on a typical usage of the fluid monitoring system and its constituent elements, unless indicated otherwise or clear from context.

Figure 3:
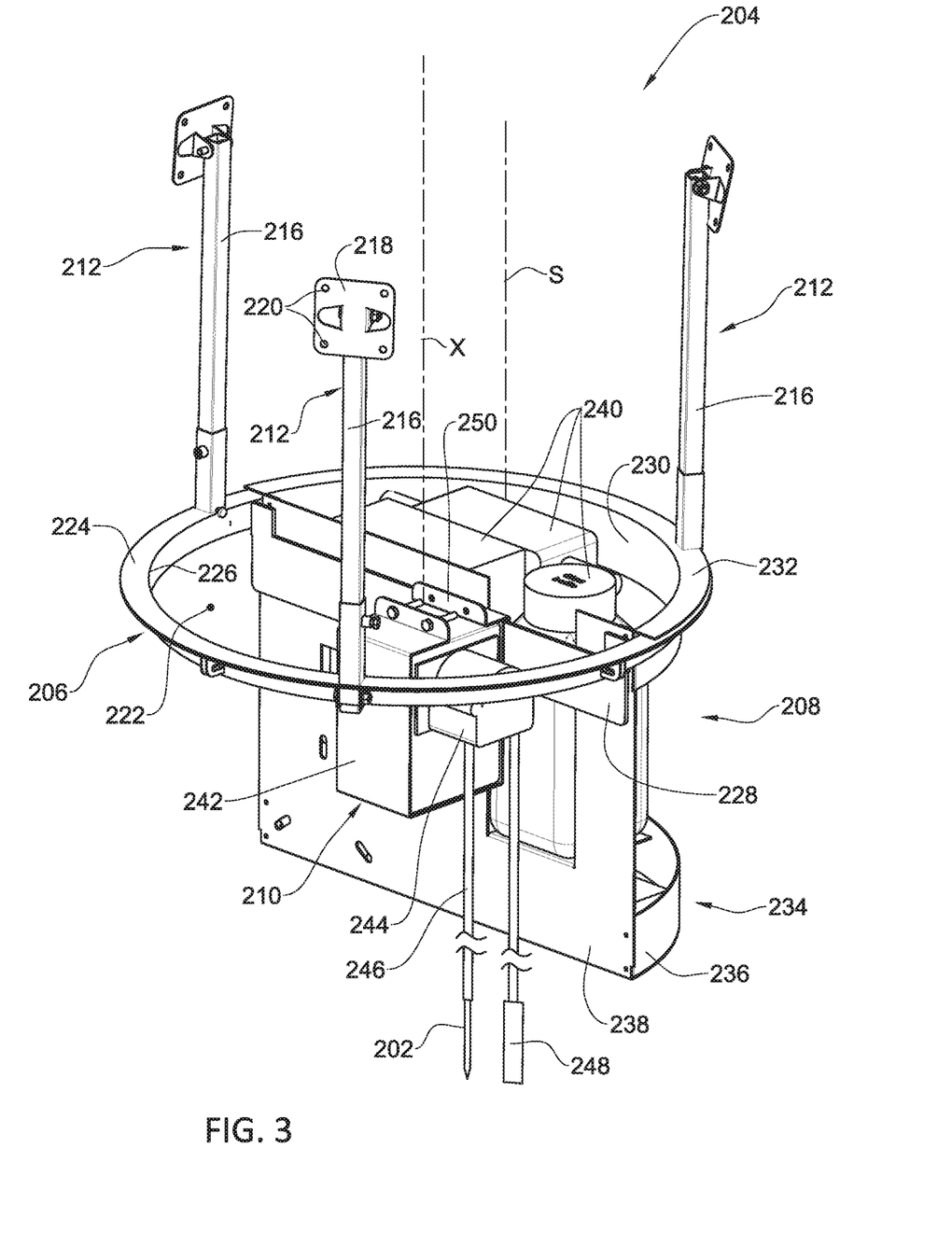
FIG. 3 is a perspective view of a support arrangement of the fluid monitoring system illustrated in FIG. 2.

As illustrated in FIG. 3, the support arrangement 204 may comprise an attachment arrangement, which is generally indicated at 206, supporting a cross-rail assembly, which is generally indicated at 208. It may further comprise a lifting assembly, which is generally indicated at 210, mounted on the cross-rail assembly and configured to raise and lower the fluid monitor.

The attachment arrangement 206 is configured to facilitate mounting of the support arrangement 204 within the vertical access shaft 130, and, as alluded to above, to support the cross-rail assembly 208. Accordingly, it may comprise a plurality, for example at least three, of attachment elements 212 and an arcuate, e.g., circular, carrying member 214 connected thereto.

Each of the attachment elements 212 may comprise an elongate member 216 having a mounting plate 218 articulate to an upper end thereof. Each of the mounting plates 218 be configured to freely pivot with respect to its respective elongate member 216. According to some examples, each of the mounting plates 218 may be further configured to be selectively secured in an orientation with respect to its respective elongate member 216, for example during installation of the support arrangement, or during maintenance.

The mounting plates 218 are configured to facilitate securing the attachment elements 212 to a wall, e.g., sidewalls or a manhole cover, of the vertical access shaft 130. Accordingly, each may be formed with one or more mounting apertures 220 for receipt therethrough of a connection element, such as a bolt, hook, etc.

The carrying member 214 is configured to bear the cross-rail assembly 208 thereon. Accordingly, it is formed as a hollow, circular member, defining a large central aperture 222 through which the cross-rail assembly 208 is received during use, and through which the cross-rail assembly 208 may be inserted or removed, for example by respectively lowering or lifting it when the attachment arrangement 206 is secured to the wall of the vertical access shaft 130.

As will be described below, an upper surface 224 of the carrying member 214 is configured to bear the cross-rail assembly 208 thereupon. The upper surface 224 may be configured to cooperate with a mating surface of the cross-rail assembly 208 to provide sufficient friction such that when it is resting thereupon, free rotation of the cross-rail assembly is prevented, for example under normal operating conditions. The upper surface 224 may comprise an inwardly disposed margin 226, defining a circle circumscribing the central aperture 222 and being unobstructed by other elements of the attachment arrangement 206, for receipt thereon of the cross-rail assembly 208. It will be appreciated that the area of the upper surface 224 which is for receipt thereon of the cross-rail assembly 208 may comprise more than the inwardly disposed margin 226; for example, as illustrated in FIG. 3, the entire upper surface 224 of the carrying member 214 may be designed therefor. However, in order to allow rotation of the cross-rail assembly 208 with minimal lifting from a position in which it is resting on the carrying member 214, at least an inner margin of the upper surface 224 thereof should define a circle unobstructed by other elements of the attachment arrangement 206.

The cross-rail assembly 208 is configured to be supported by the attachment arrangement 206, and to be rotatable about vertical axis X when received within the aperture 222 defined therein. The cross-rail assembly comprises a cross-rail 228 rigidly connected to an arcuate mounting component 230. The mounting component 230 comprises an outwardly projecting lip 232 defining an arcuate shape corresponding to at least the margin 226 of the upper surface 224 of the carrying member 214, thereby allowing engagement thereof therewith, i.e., the lip 232 is shaped so as to lie in registration over the margin 226, facilitating support of the cross-rail assembly 208 by the attachment arrangement 206.

The corresponding arcuate shapes of, on the one hand, the aperture 222 circumscribed by the margin 226 and, on the other hand, the mounting component 230 allow rotation of the cross-rail assembly 208 within the attachment arrangement 206, for example when the former is slightly lifted, e.g., by a user. As described above, when the cross-rail assembly 208 is supported by the attachment arrangement 206, i.e., according to the present example when the lip 232 of the cross-rail assembly 208 rests on the margin 226 of the attachment arrangement 206, the friction therebetween restricts or prevents free rotation of the cross-rail assembly, for example under normal operating conditions.

The cross-rail assembly may further comprise a basket, generally indicated at 234, rigidly connected thereto such that it moves therewith. The basket 234 may comprise a base 236 and a vertically extending partition 238, below or to one side of the cross-rail 228, e.g., being parallel therewith. The basket 234 may comprise and/or be configured to accommodate one or more functional auxiliary elements 240 therewithin. The auxiliary elements 240 may be configured for operating with the support arrangement and/or the fluid monitor 202 during use. For example, they may comprise a power supply (e.g., one or more batteries), a controller configured to direct operation of the support arrangement and/or the fluid monitor, a transceiver, a display unit, an input port, and/or an output port.

The lifting assembly 210 is configured to facilitate suspension of the fluid monitor 202 from the cross-rail assembly 208, and to facilitate raising and/or lowering it to a required vertical height. Accordingly, it may comprise a motor unit 242 driving a pulley assembly 244. The pulley assembly 244 selectively rotates a cable 246 hanging therefrom, raising one end thereof and lowering the other. A first end of the cable 246 defines a suspension axis S and carries the fluid monitor, and a second end thereof carries a counterweight 248. The cable may be made of any suitable material, and be provided according to any suitable design.

According to some examples, the lifting assembly 210 may be configured, for example upon receipt of a monitoring trigger, to lower the fluid monitor 202 to a monitoring vertical position above, at, or below the surface of the wastewater flow. A monitoring trigger may be, e.g., receipt of a command from a remote management system, expiration of a timer, etc.

The lifting assembly 210 may further be configured, for example subsequent to a monitoring operation by the fluid monitor 202, to raise the fluid monitor to a standby position above the surface of the fluid. The standby position may be calculated to be sufficiently high above the surface of the fluid such that fouling, biofilm accumulation, etc., is mitigated or prevented. The standby position may be the highest vertical position possible as determined by the construction of the lifting assembly 210.

Figure 4:
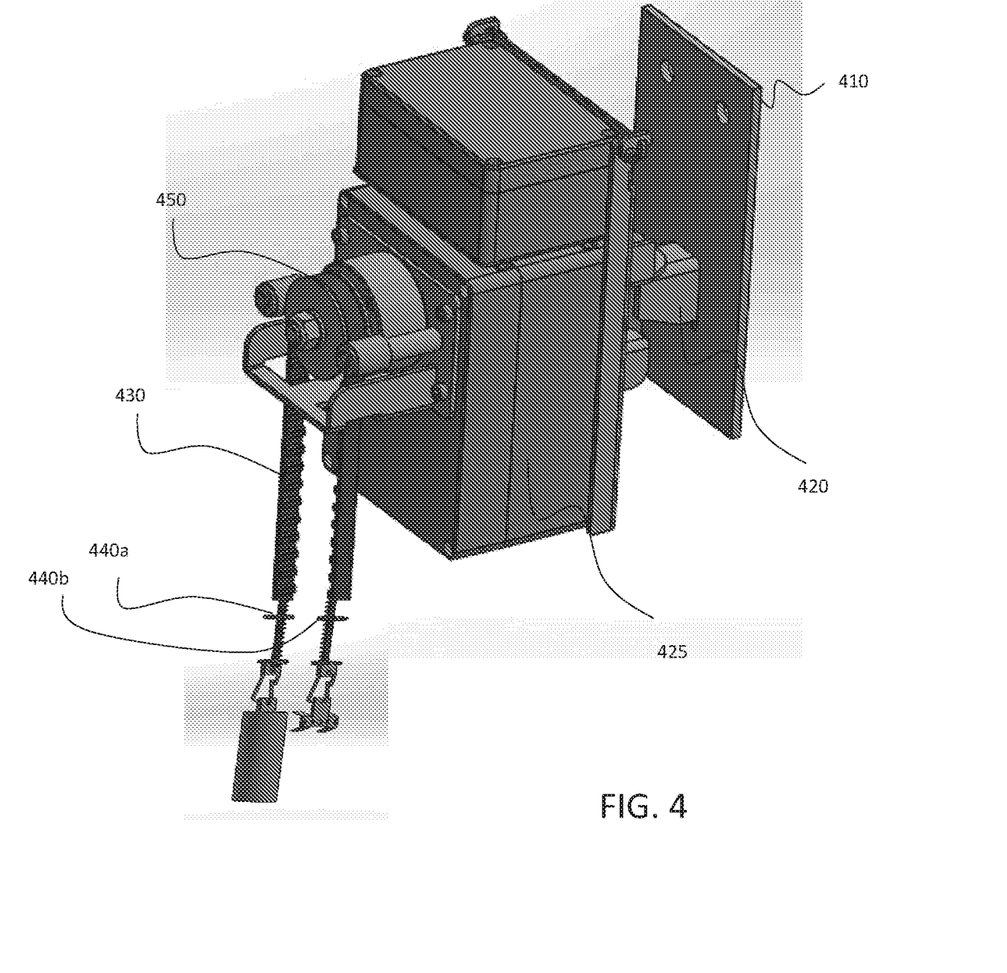
FIG. 4 is a perspective view of an example of a lifting arrangement of the support arrangement illustrated in FIG. 3.

The lifting assembly is described in more detail below with reference to and as illustrated in FIG. 4.

The lifting assembly 210 is mounted on the cross-rail 228 such that it may be slid laterally therealong (i.e., in a direction perpendicular to the vertical axis X and along the length of the cross-rail 228) to one of a plurality of positions. For example, the lifting assembly 210 may comprise a hanger element 250 rigidly connected to the motor unit 242 and engaged with the cross-rail 228.

The cross-rail 228 may be positioned such that, in at least one lateral position, e.g., the lateral midpoint of the cross-rail, the suspension axis S is coincident with the vertical axis X about which the cross-rail assembly 208 rotates. This may be accomplished by disposing the cross-rail 228 such that the suspension axis S moves along the diameter of a circle which is intersection by the vertical axis X at its center. Accordingly, the suspension axis S may be disposed at any position within a circle defined by the extreme lateral positions of cross-rail 228 by selecting an appropriate combination of angular (i.e., rotational) position of the cross-rail assembly 208 and lateral position of the lifting assembly 210 along the length of the cross-rail 228.

An arresting mechanism (not illustrated) may be provided to secure the lifting assembly 210 at a lateral position along the length of the cross-rail 228. According to some examples, the arresting mechanism comprises a set screw, e.g., screwingly engaged with the lifting mechanism 210, and configured to be tightened to bear against the cross-rail 228. According to other examples, the arresting mechanism is constituted by elements of the lifting assembly 210 and cross-rail 228 which form a tight fit with one another; the lifting assembly 210 may be moved, e.g., by a user applying a sufficient sliding force. According to further examples, the arresting mechanism comprises a plurality of apertures formed along the length of the cross-rail 228, each of which corresponds to one of several lateral positions; the arresting mechanism further comprises a pin configured to mate with one of the apertures and to arrest movement of the lifting assembly 210.

It will be appreciated that the support arrangement 204 as described above allows a user, such as a technician, to dispose the fluid monitor 202 at any desired horizontal position below the vertical access shaft in which it is installed. This may be useful, e.g., if the vertical access shaft is not centered above a sewer duct 120, or in some other way requires that the location of the fluid monitor 202 be horizontally adjusted. Moreover, the support arrangement 204 facilitates disposing the fluid monitor 202 at any desired vertical position, for example in relation to the top surface of the fluid within the open channel vessel. It also facilitates placement of the cross-rail assembly 208 such that elements thereof (such as basket 234) do not interfere with other objects which may be in the vertical access shaft, such as ladders, etc.

Moreover, the support arrangement 204 facilitates easy access thereto by a technician, and the cross-rail assembly 208, together with the lifting assembly 210 and auxiliary elements 240, may be easily lifted from the support arrangement 204, thereby removing it from vertical access shaft without the need to remove any connection elements which secure the support arrangement 204 thereto. It further allows maintenance of elements thereof to be performed remote from the vertical access shafts, for example so that interference in a public thoroughfare is minimized.

As illustrated in FIG. 4, the lifting assembly 210 may comprise a lifting unit attachment mechanism 410, which may be attached (for example, bolted) to the cross-rail 228 at a predetermined position therealong. It may further comprise a hinge 420, which can be attached to, for example, an attachment mechanism 410 and a casing 425. In some embodiments of the presently disclosed subject matter, the lifting assembly 210 is attached to the crossrail 228 via the hinge 420. In such embodiments, the lifting assembly 210 can move rotationally within the cross-rail assembly 208, thus providing an additional degree of freedom for positioning the fluid monitor 202 in an optimal location above a flow. For example, if lifting assembly 210 is attached to the crossrail 228, then it is possible to, for example, position the monitoring payload by rotating the cross-rail assembly 208 so that the crossrail 228 is above a desired fluid monitor 202 placement position. It is then possible to, for example, position the lifting assembly 210 to a particular position along the crossrail so that the fluid monitor 202 can be lowered to the desired position. It is then possible to rotate the lifting unit on hinge 420 to more precisely position the fluid monitor 202 (for example, so that the fluid monitor 202 is at the proper angle in the flow)

The motor unit 242 may comprise a processor-based control unit with memory, a pulley motor to control the pulley assembly 244 for raising/lowering the fluid monitor 202, and other components (for example, as illustrated hereinbelow with reference to FIG. 5).

Lifting assembly 210 can support the cable 246 on the pulley assembly 244. Lifting assembly 210 can, for example, activate a pulley motor which can, for example, move a pulley wheel 450 of the pulley assembly 244 either clockwise or counterclockwise. In this manner, lifting assembly 210 can cause lowering/raising of fluid monitor 202 which is suspended on the cable 246.

The cable 246 can be, for example, a belt consisting of plastic, rubber and/or other suitable materials, with width adapted, for example, to pulley wheel 450. In some embodiments, the cable 246 can be a toothed belt that is adapted for placement on a grooved pulley wheel 450. In some embodiments, lifting assembly 210 can include, for example, rotation-monitoring, functionality, so that the processor-based control unit can determine a number of discrete steps that the pulley wheel 450 has moved from (for example) an initial position.

Stoppers 440a, 440b can be located on the cable 246. The stoppers 440a, 440b can restrain the motion of the cable 246 as the pulley wheel 450 is being moved in either the clockwise or counterclockwise direction. Consequently, in some embodiments of the presently disclosed subject matter, the location of the stoppers 440a, 440b determines the maximum and minimum height of the fluid monitor 202 from the bottom of the vertical access shaft 130.

Use of stoppers 440a, 440b can moreover ensure that the fluid monitor 202 will always be halted in its downward progress and not be accidentally dropped to the floor of the channel in a case of lack of fluid in the channel or other failure condition.

Figure 5:
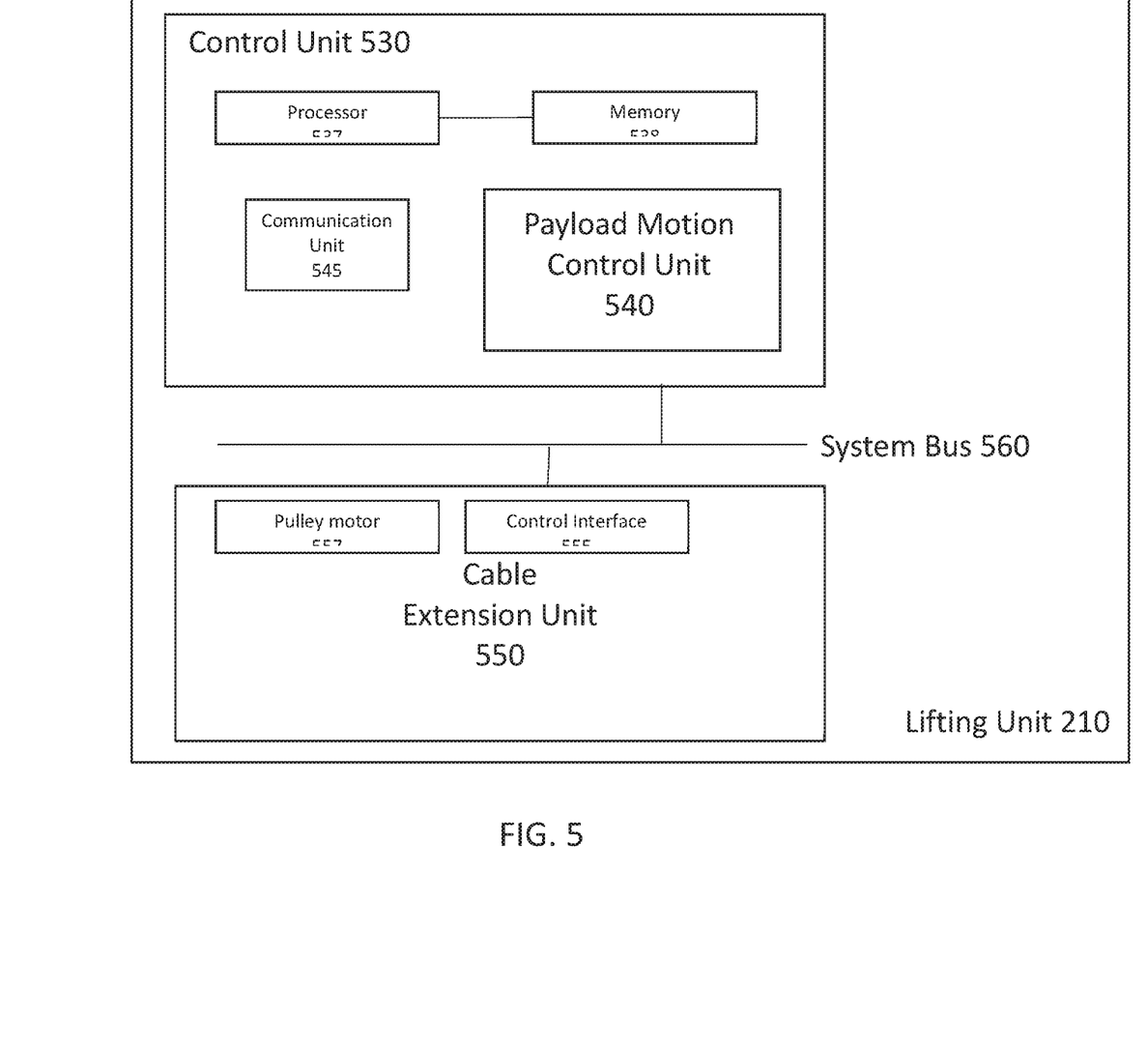
FIG. 5 is a block diagram of the lifting assembly illustrated in FIG. 4.

Attention is now directed to FIG. 5, which illustrates a block component diagram of an example the lifting assembly 210 according to some embodiments of the presently disclosed subject matter.

Lifting assembly 210 can include a processor-based control unit 530 which in turn can include, for example, a processor 537 operatively coupled to a memory 538.

A processor 537 can be a hardware-based electronic device with data processing capabilities, such as, for example, a general-purpose processor, a specialized Application Specific Integrated Circuit (ASIC), one or more cores in a multicore processor etc. A processor 537 can also consist, for example, of multiple processors, multiple ASICs, virtual processors, combinations thereof etc.

A memory 538 can be, for example, any kind of volatile or non-volatile storage, and can include, for example, a single physical memory component or a plurality of physical memory components. Memory 538 can also include virtual memory. The memory 538 can be configured to, for example, store various data used in computation.

As will be further detailed hereinbelow with reference to FIG. 8, the control unit can be configured to execute several functional modules in accordance with computer-readable instructions implemented on a non-transitory computer-readable storage medium. Such functional modules are referred to hereinafter as comprised in the control unit. These modules can include, for example, payload motion control unit 540 and communication unit 545. Payload motion control unit 540, can, for example, perform methods for receiving positioning and sensing data from the fluid monitor 202 and controlling the motion of the fluid monitor by sending instructions to cable extension unit 540. Communication unit 545 can perform methods for transmission to and reception from communication interfaces (not shown), such as, for example, a cellular data link for communication with a central management system, and/or a short-distance link such as Bluetooth for communication with fluid monitor 202.

Lifting assembly 210 can include cable extension unit 540, which in turn can include mechanical components for control of, for example, pulley wheel 450 and other components described hereinabove, with reference to FIG. 4. In some embodiments, cable extension unit 540 can include a pulley motor 557 which can act on pulley wheel 450 to move it clockwise or counterclockwise responsive to commands received from control interface 555. Control interface 555 can be a digital interface which receives commands from control unit 530 via, e.g., the system bus 560.

In some embodiments, control unit 530 (e.g., payload motion control unit 540) can send a digital signal to the cable extension unit 540, for example, via control interface 555) commanding a single quantum of motion of the pulley motor in either the clockwise or counterclockwise direction. Suspension-band extension unit 540 can then responsively induce an appropriate motion of the pulley motor, which then causes either extension or retraction of the cable 246 by one quantum of motion. In this context, "quantum of motion" can mean a certain length of the cable 246, for example, 5 cm, one tooth on a toothed belt, etc.

In such embodiments, control unit 530 (for example, payload motion control unit 540) can lower or raise fluid monitor 202 by repeatedly sending digital signals to cable extension unit 540 (for example, control interface 555) until a desired amount of vertical motion is completed, or until a particular event has taken place.

Figure 6:
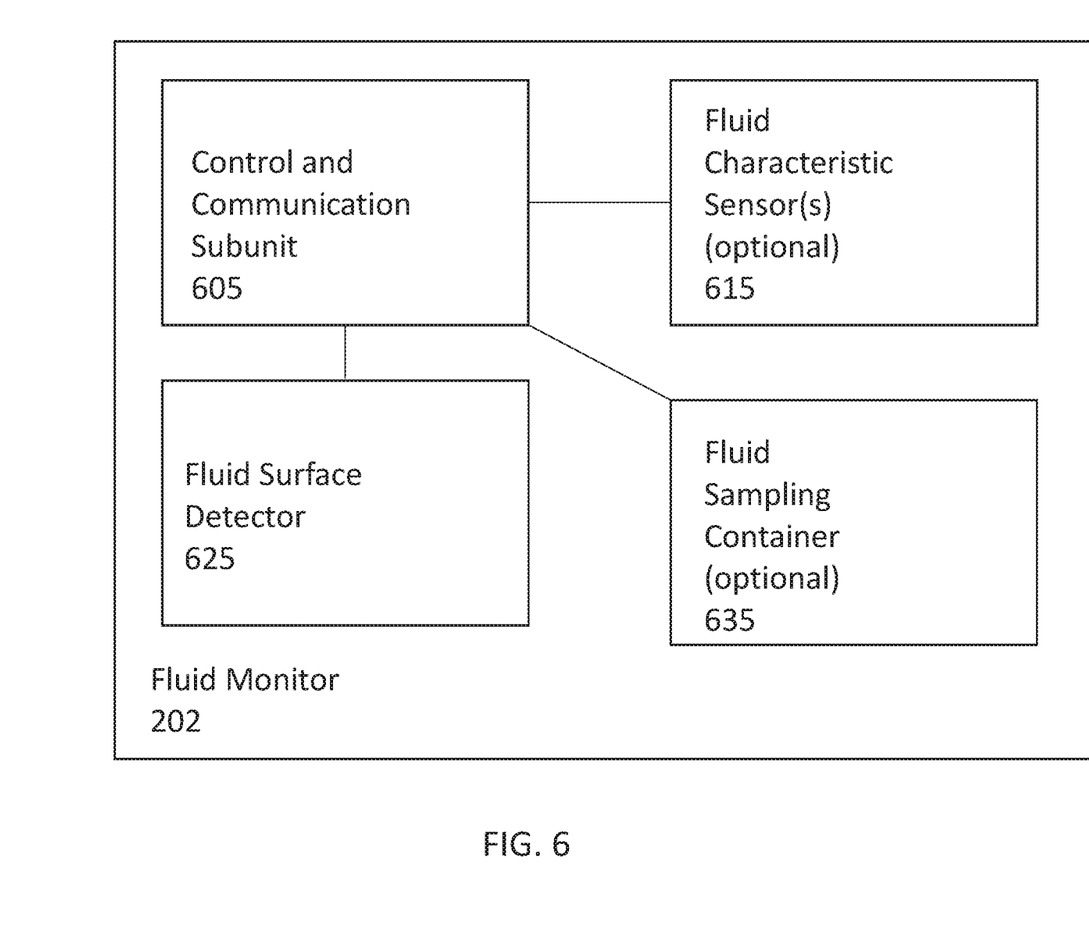
FIG. 6 is a block diagram of an example of a fluid monitor of the fluid monitoring system illustrated in FIG. 2.

Attention is now directed to FIG. 6, which illustrates a block component diagram of an example fluid monitor 202 according to some embodiments of the presently disclosed subject matter.

Fluid surface detector 625 can include suitable components for detecting a fluid surface, as known in the art In some embodiments, fluid surface detector 625 includes a water presence sensor, which can detect a fluid surface upon contact with it. In some embodiments, a water presence sensor can utilize horizontal float switch in which a floating component rises to a level of surrounding liquid, thereby activating a circuit. In some embodiments, fluid surface detector 625 includes an ultrasonic sensor, which can detect a fluid surface from a distance above it.

Control and communication subunit 605 can include components for communication with components external to fluid monitor 202. In some embodiments, control and communication subunit 605 includes components for wireless communication with lifting assembly 210 (e.g., a Bluetooth transceiver and related control components). In some embodiments, control and communication subunit 605 includes components for signaling over a physical cable (which could be attached to cable 246). Such components can he used to transmit notification of surface detection to lifting assembly 210 or to receive commands from lifting assembly 210.

In some embodiments, control and communication subunit 605 includes components for wireless communication with a management server (e.g., a cellular transceiver and related control components). Such components can he used to transmit sensed parameter data to the management server.

In some embodiments, control and communication subunit 605 includes a processor and memory (not shown).

Optional fluid characteristic sensors 615 can include components for determining characteristics of the fluid flow. Characteristics of the fluid flow can include data descriptive of the flow such as constitution, reactive and behavioral properties, velocity etc.

In some embodiments, fluid characteristic sensors 615 can include a contact-based sensor. In sonic embodiments. fluid characteristic sensors 615 can include a contact-based pH sensor. In some embodiments, fluid characteristic sensors 615 can include a contact-based electroconductivity sensor.

In some embodiments, fluid characteristic sensors 615 can include a contactless sensor. In sonic embodiments, fluid characteristic sensors 615 can include an ultrasound-based contactless sensor.

Optional fluid sampling container 635 can include a compartment for fluid storage and an opening for fluid intake. In some embodiments, fluid sampling container 635 intakes and stores a sample of the flow, responsive to instructions from lifting assembly 210.

Figure 7:
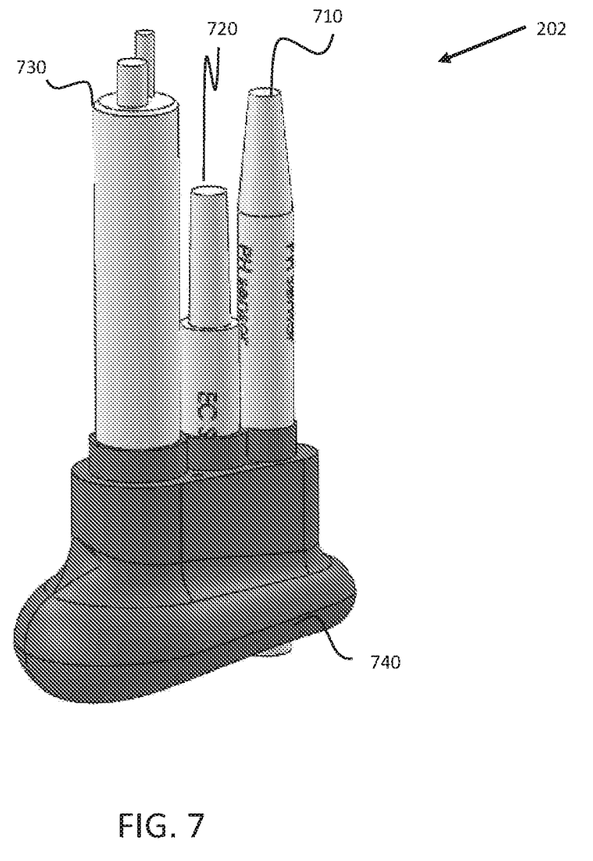
FIG. 7 is a perspective view of an example of a fluid monitor of the fluid monitoring system illustrated in FIG. 2.

Attention is now drawn to FIG. 7, illustrating an example structure of a contact-based fluid monitor 202, according to some embodiments of the presently disclosed subject matter.

Fluid monitor 202 can include a casing 740, which can contain various sensors/monitors that are to be applied to the flow. The casing can also contain, for example, a power supply, a wireless transceiver or a wired component (all not shown) to enable communication of sensor/monitor data to a processor-based controller in lifting assembly 210.

In some embodiments, fluid monitor 202 can perform contact-based monitoring of fluid characteristics. In some embodiments, fluid monitor 202 can perform contactless monitoring of fluid characteristics. in some embodiments, fluid monitor 202 can perform sampling of a fluid to facilitate (for example) subsequent analysis. In some embodiments, fluid monitor 202 can transmit monitoring data to, for example, a remote monitoring data collection system (not shown).

Fluid monitor 202 can include a water presence sensor 730, which can utilize, for example, a horizontal float switch or other suitable techniques for determining whether the sensor is currently in contact with a fluid.

Fluid monitor 202 can include a pH sensor 710.

Fluid monitor 202 can include a electroconductivity sensor 720.

Figure 8:
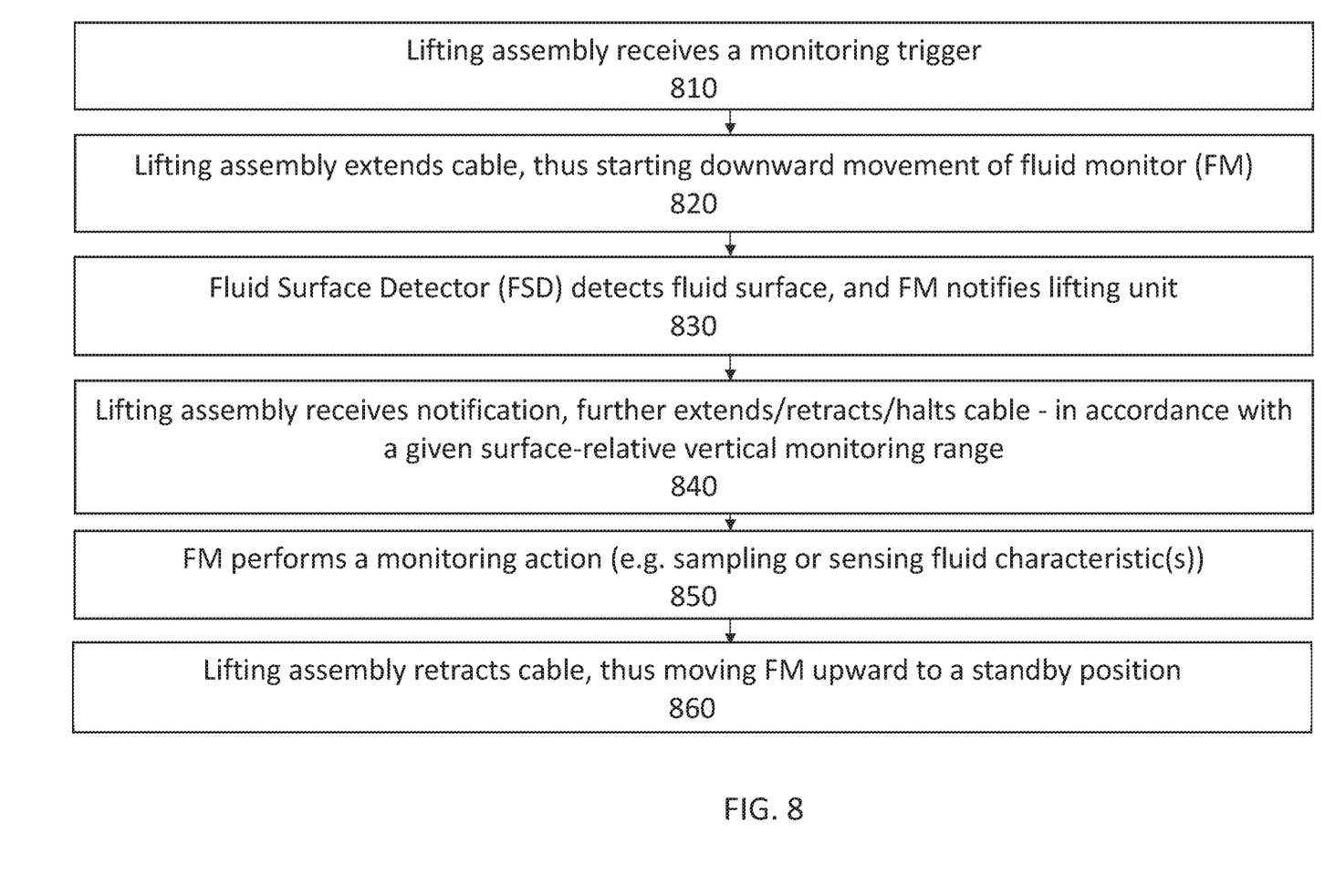
FIG. 8 is a flowchart of an example of a processor-based method of monitoring a flow in an open channel vessel.

Attention is now drawn to FIG. 8, which illustrates a flowchart of an example processor-based method of monitoring a flow in a fluid transport channel, according to some embodiments of the presently disclosed subject matter.

Before the method begins, the fluid monitor 202 can be located at some initial vertical position a certain distance above the current level of the fluid flow. The initial vertical position can be, for example, the highest vertical position enabled by the lifting assembly 210, The initial position can also be, for example, the position where lifting assembly 210 positioned fluid monitor 202 at the end of the previous monitoring cycle. It is noted that the level of fluid flow can go up or down according to, for example, the amount of fluid entering the channel vessel, and other factors.

Responsive to a monitoring trigger event 810 (such as, for example, the expiration of a timer, or a signal from a remote management station, etc.), lifting assembly 210 (for example, payload motion control unit 540) can extend affixed the cable 246, thereby lowering the fluid monitor 202 as described hereinabove with reference to FIG. 5.

As the fluid monitor 202 descends, fluid surface detector 625 can detect 830 the surface of the fluid flow. Responsive to this detection, fluid monitor 202 (for example, control and communication subunit 605) can then notify the lifting assembly 210 of the detection (for example, by sending a data notification over a short-distance wireless link, or via a signal on a physical signaling cable).

In some embodiments, fluid surface detector 625 detects the surface of the fluid flow upon contact of the descending fluid monitor 202 with a surface of the fluid flow (e.g., when the fluid surface detector 625 is a water presence sensor). In some embodiments, fluid surface detector 625 detects the surface of the fluid flow prior to contact of the descending fluid monitor 202 with a surface of the fluid flow (e.g., when the fluid surface detector 625 is an ultrasonic sensor which detects the surface of fluid flow and the current distance of fluid monitor 202 from the surface).

It is noted that in some cases, lifting assembly 210 might halt the descent of fluid monitor 202 before detection of a surface of the fluid flow (for example, a stopper 440a might end the descent). in such cases, the lifting assembly 210 (for example, payload motion control unit 540) can take appropriate corrective action (such as raising a maintenance alarm).

Lifting assembly 210 (for example, payload motion control unit 540) can then receive 840 notification of the detection of the surface of the fluid flow by fluid surface detector 625 (for example, via a wireless communication link).

In some embodiments, lifting assembly 210 (for example, payload motion control unit 540) can, responsive to receipt of the notification of the surface detection, transmit data derivative of a degree of cable extension to a managing unit (such as a centralized management server). By way of non-limiting example, lifting assembly 210 (for example, payload motion control unit 540) can determine how far the fluid monitor 202 was extended downward (for example, by determining the number of quanta of motion by which the cable has been extended). Lifting assembly 210 (for example, payload motion control unit 540) can store this value in local memory and/or determine the current fluid level from this value. In some embodiments, lifting assembly 210 (for example, communication unit 545) transmits this value and/or determined fluid level and/or degree of cable extension to a management server (either immediately, or after a delay).

Responsive to receipt of the notification of the surface detection, lifting assembly 210 (for example, payload motion control unit 540) can next retract or further extend 840 the affixed cable 246 so as to position fluid monitor 202 in accordance with a pre-known surface-relative vertical monitoring range. Alternatively, lifting assembly 210 (for example, payload motion control unit 540) fluid monitor 202 can (responsive to receipt of the notification) halt the current extending of the affixed cable 246, thus halting the movement of the fluid monitor 202, for example if the current vertical position of the fluid monitor 202 is in accordance with the pre-known surface-relative vertical monitoring range.

In this context, the pre-known surface-relative vertical monitoring range can refer to a range of heights or depths, relative to the surface of the fluid flow, where the fluid monitor 202 can be positioned in order to perform a particular monitoring or sampling activity. In this context, a position being in accordance with a range of heights or depths can mean that the position is located within the range.

By way of non-limiting example, in some embodiments fluid monitor 202 includes fluid characteristic sensor(s) 615 which are contact-based. An example pre-known surface-relative vertical monitoring range for such sensors includes the surface of the flow e.g., precisely at the surface of the flow (i.e., the range would be 0). Another example pre-known surface-relative vertical monitoring range for such sensors is a range from 0 to −10 cm.

By way of further non-limiting example, in some embodiments fluid monitor 202 includes fluid characteristic sensor(s) 615 which are contactless e.g., utilizing ultrasound. An example pre-known surface-relative vertical monitoring range for such sensors is above the surface of the flow e.g., a range from +1 to +1.5 meters. Such a range could be chosen, for example, so that the fluid characteristic sensor(s) 615 is not fouled even if the flow level increases, and so that the measurement quality is optimal.

By way of further non-limiting example, in some embodiments fluid monitor 202 includes fluid sampling container 635. An example pre-known surface-relative vertical monitoring range for such fluid monitors 202 a range from −0.5 to −0.75 meters. Such a range could be chosen, e.g., so that fluid can be captured in fluid sampling container 635.

It is noted that in some embodiments, pre-known surface-relative vertical monitoring ranges are known at the time of manufacture or at the time of installation of the lifting assembly 210, and that the range values can thus be accordingly configured into the lifting assembly 210.

It is further noted that in some embodiments, the pre-known surface-relative vertical monitoring range can be determined at the time of the positioning of the fluid monitor 202, or at other times during the execution of the method.

For example, in some embodiments the pre-known surface-relative vertical monitoring range can be determined periodically in accordance with temperature, humidity, or other environmental or non-environmental factors which affect sensor measurement quality.

After fluid monitor 202 has been positioned in accordance with the pre-known surface-relative vertical monitoring range, fluid monitor 202 and/or its components can perform 850 a monitoring action (such as sensing fluid characteristics, or sampling the fluid).

In some embodiments, one or more fluid characteristic sensors can sense characteristics of the fluid flow. In some embodiments, the fluid characteristic sensors can include a pH sensor, which determines the pH of the fluid flow. In some embodiments, the fluid characteristic sensors can include an electroconductivity sensor, which determines the electroconductivity of the fluid flow. In some embodiments, fluid monitor 202 (for example, control and communication subunit 605) transmits data indicative of the sensed characteristic(s) to, for example, a management server. In some embodiments, a fluid sampling container 635 samples the fluid of the fluid flow.

The performance of the monitoring action by the fluid monitor 202 or its components can be responsive to, for example, an instruction received from the lifting assembly 210 over a short-distance wireless link, a timer expiration etc. In some embodiments, the monitoring action is ongoing (e.g., a sensor which always monitors pH). In some embodiments, fluid monitor 202 (for example, control and communication subunit 605) stores or transmits data indicative of sensed fluid characteristics responsive to, for example, an instruction received from the lifting assembly 210 over a short-distance wireless link, a timer expiration etc.

Subsequent to a monitoring action, lifting assembly 210 (for example, payload motion control unit 540) can retract 860 the affixed cable 246 to move fluid monitor 202 to a monitoring payload standby position above the fluid flow. Lifting assembly 210 (for example, payload motion control unit 540) can initiate retraction responsive to, for example, receiving a trigger indicative of completion of a monitoring action (for example, expiration of a timer, receipt of a notification from the monitoring payload over a short-distance wireless link etc.).

In some embodiments, lifting assembly 210 (for example, payload motion control unit 540) can retract the cable 246 in full, so that fluid monitor 202 is at the highest vertical position that lifting assembly 210 enables, In some embodiments, lifting assembly 210 (for example, payload motion control unit 540) can partially retract the cable 246 so that fluid monitor 202 is at a height above the surface of fluid flow that is in accordance with a pre-known surface-relative minimum standby vertical distance.

By way of non-limiting example, in some embodiments variations in level of the fluid flow may necessitate keeping fluid monitor 202 at a distance (e.g., 0.5 meters) above the fluid flow so as to prevent corrosion or fouling of the fluid monitor 202. In this case, lifting assembly 210 (for example, payload motion control unit 540) can retract the cable 246 so that fluid monitor 202 is at a height above the surface of fluid flow that is at least equal to a pre-known surface-relative minimum standby vertical distance of 0.5 meters.

In some embodiments of the presently disclosed subject matter, the lifting unit (for example, payload motion control unit 540) can detect from the upward movement of the fluid monitor 202 whether there is additional mass present (which could indicate that solid material has attached to fluid monitor 202. The control (for example, payload motion control unit 540) can then take appropriate corrective actions (such as, for example, moving the fluid monitor 202 downward and upward again to try to eliminate the solid material, or by raising a maintenance alarm).

In some embodiments of the presently disclosed subject matter, the lifting unit (for example, payload motion control unit 540) can detect when batteries powering it (or other components such as the pulley motor) are approaching power depletion. in such embodiments, the lifting unit (for example, payload motion control unit 540) can lower the fluid monitor 202 to an optimal height (for example, relative to the surface of fluid flow), and allow fluid monitor 202 to remain at that height until the power issue has been addressed.

It is to be understood that the invention is not limited in its application to the details set forth in the description contained herein or illustrated in the drawings. The invention is capable of other embodiments and of being practiced and carried out in various ways. Hence, it is to be understood that the phraseology and terminology employed herein are for the purpose of description and should not be regarded as limiting. As such, those skilled in the art will appreciate that the conception upon which this disclosure is based may readily be utilized as a basis for designing other structures, methods, and systems for carrying out the several purposes of the presently disclosed subject matter.

It will also he understood that the system according to the invention may he, at least partly, implemented on a suitably programmed computer. Likewise, the invention contemplates a computer program being readable by a computer for executing the method of the invention. The invention further contemplates a non-transitory computer-readable memory tangibly embodying a program of instructions executable by the computer for executing the method of the invention.

Those skilled in the art to which this invention pertains will readily appreciate that numerous changes, variations, and modifications can be made without departing from the scope of the presently disclosed subject matter, mutatis mutandis.

The invention claimed is:

1. A support arrangement configured for being secured within a vertical shaft and for facilitating positioning of a fluid monitor suspended therefrom, the support arrangement comprising:
   an attachment arrangement configured to be secured to a vertical access shaft of an open channel fluid transport system;
   a cross-rail assembly comprising a cross-rail and being configured to be mounted to the attachment arrangement for being supported thereby; and
   a lifting assembly mounted on said cross-rail and configured for suspension therefrom of the fluid monitor along a vertically-extending suspension axis;
   wherein said cross-rail is configured to be rotatable about a vertical axis when at least partially received within the attachment arrangement; and
   wherein said lifting assembly is configured to be selectively secured to one of a plurality of lateral positions along the length of the cross-rail.

2. The support arrangement according to claim 1, wherein said cross- rail assembly further comprises an arcuate mounting component configured to engage with said attachment arrangement for securing thereby and the rotation about the vertical axis.

3. The support arrangement according to claim 2, wherein said mounting component comprises a lip configured to lie on said attachment arrangement.

4. The support arrangement according to claim 3, wherein said lip and attachment arrangement are configured to resist rotation of the cross-rail assembly when it is supported by the attachment arrangement.

5. The support arrangement according to claim 2, wherein said cross-rail is rigidly connected to said mounting component.

6. The support arrangement according to claim 1 wherein the lifting assembly and cross-rail are configured to facilitate slidable mounting of the lifting assembly to the cross-rail.

7. The support arrangement according to claim 1, further comprising an arresting mechanism configured to secure the lifting assembly at one of said lateral positions.

8. The support arrangement according to claim 7, wherein said arresting mechanism comprises a set screw configured to mate with one of the lifting mechanism or the cross-rail, and to be tightened to bear against the other of the lifting mechanism or the cross-rail.

9. The support arrangement according to claim 7, wherein said arresting mechanism comprises a snug fit between the lifting assembly and the cross-rail.

10. The support arrangement according to claim 7, wherein said arresting mechanism comprising a plurality of apertures formed along the length of the cross-rail and each corresponding to one of said lateral positions, and further comprises a pin configured to mate with one of the apertures and to arrest movement of the lifting assembly.

11. The support arrangement according to claim 1 wherein said cross-rail intersects said vertical axis.

12. The support arrangement according to claim 1 wherein said cross-rail is offset from said vertical axis.

13. The support arrangement according to claim 1, wherein said attachment arrangement comprises a plurality of attachment elements.

14. The support arrangement according to claim 13, wherein each of said attachment elements comprises one or more mounting apertures for receipt therethrough of a connection element.

15. The support arrangement according to claim 1, wherein said attachment arrangement comprises an arcuate carrying member configured to bear the cross-rail assembly.

16. The support arrangement according to claim 15, wherein said carrying member is formed as a circle and defines a central aperture configured for receipt therethrough of said cross-rail assembly.

17. The support arrangement according to claim 1, further comprising one or more auxiliary elements carried by said cross-rail assembly.

18. The support arrangement according to claim 1, being configured to dispose said fluid monitor to a predetermined vertical position therebelow.

19. The support arrangement according to claim 1 wherein said lifting assembly comprises a motor-driven pulley assembly configured to selectively raise and lower said fluid monitor.

20. A fluid monitoring system comprising a fluid monitor and the support arrangement according to claim 1.

* * * * *